Aug. 13, 1963   J. A. DUNBAR ETAL   3,100,337
SPLICING ALUMINUM FOIL
Filed July 12, 1960
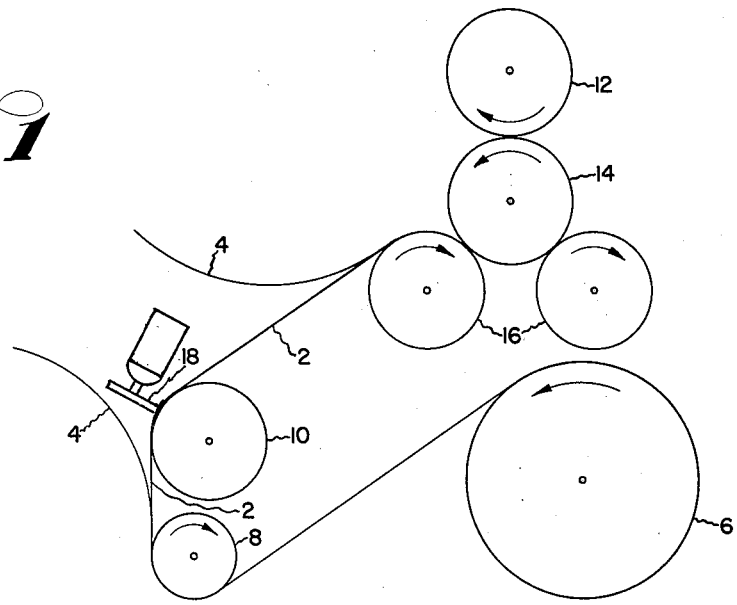
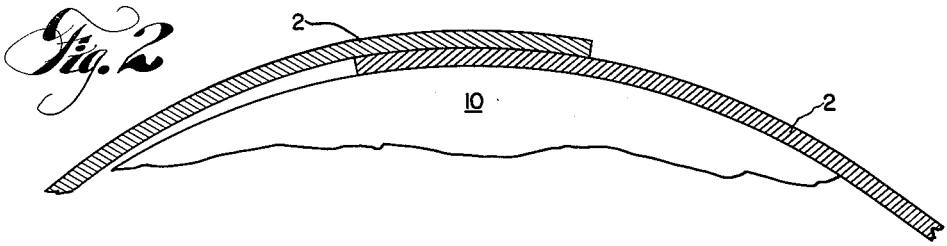
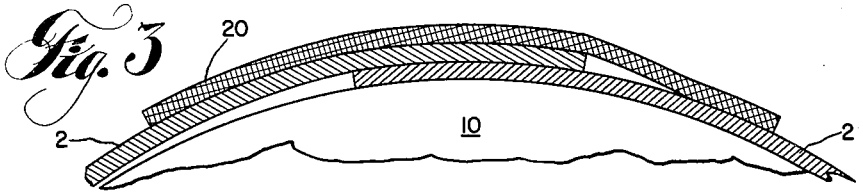
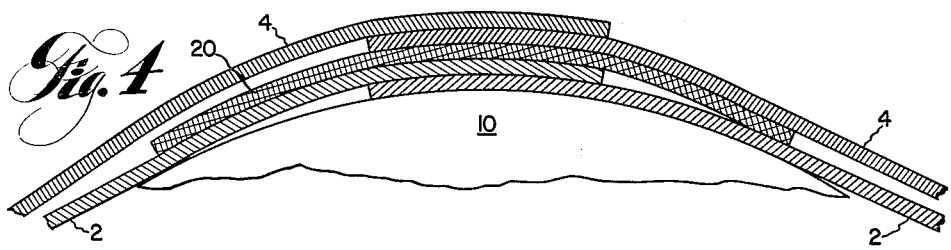
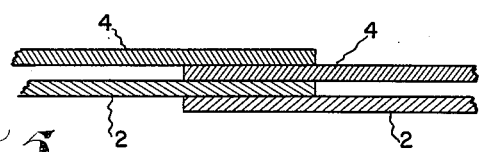
INVENTORS
JAMES A. DUNBAR
BY SELMER G. VON STOCKER
Robert T. Teeter
ATTORNEY

United States Patent Office 3,100,337
Patented Aug. 13, 1963

3,100,337
SPLICING ALUMINUM FOIL
James A. Dunbar, Lower Burrell, and Selmer G. Von Stocker, Pittsburgh, Pa., assignors to Aluminum Company of America, Pittsburgh, Pa., a corporation of Pennsylvania
Filed July 12, 1960, Ser. No. 42,420
7 Claims. (Cl. 29—470.9)

This invention relates to splicing of aluminum foil, and more particularly, to the splicing of ends of two superposed webs of aluminum foil in pack relationship by ultrasonic welding.

In the fabrication of aluminum foil, it is a conventional practice to feed two superposed webs of foil simultaneously through the rolling mill, and after the foil has been so rolled to the desired thinness the two webs are wound together in coil form. Foil so fabricated is referred to as pack-roll or pack-rolled foil. The two webs are usually separated in a following operation, such as slitting or edge trimming. For example, the coil of pack-rolled foil is unwound, passed between rotary shear knives to trim the edges and cut the foil to the desired width or widths, and the cut or cuts from the two webs of foil are then separated and rewound in two or more separate coils. During rolling, or even during unwinding, breaks in one or both webs may occur, the tendency toward breaks being more critical in the thinner gauges. A coil of pack-rolled foil thus may comprise webs of discontinuous lengths, unless provision is made for splicing the webs at the breaks. Then, too, a coil of foil is sometimes fabricated in shorter lengths than the customer requires. In either case, it is desirable, or necessary, to supply coils in long continuous lengths, which is generally practical only if a satisfactory way to splice the ends of the foil at the time of processing in pack relationship is available so as to obtain the two webs in co-extensive, continuous lengths that may be readily separated when desired.

Present known methods for splicing aluminum foil include joining the ends by an adhesive type tape or by ultrasonic welding. Where the foil is spliced by means of tape, the temperature employed in any subsequent heat treating of the foil may cause the adhesive to bleed out or may otherwise adversely affect the strength of the splice. In addition, tape creates an undesired bulge in the web and may be objectionable in subsequent processing.

Ultrasonic welding of aluminum foil possesses none of the disadvantages found with tape. Ultrasonic welding of metals is essentially a solid state metallurgical bonding process, usually carried out at ambient temperature, and without the aid of solders or fluxes. The metal parts to be joined are placed between the welding sonotrodes, usually a welding head and an opposed anvil, and clamped together under low static pressure. High frequency alternating current is converted by a transducer into mechanical vibratory energy with at least a lateral component and delivered to the metal parts through one of the sonotrodes, the welding head. While the mechanism of the process has not been fully delineated, it appears that interfacial activity induced by the elastic vibratory energy ruptures existing surface films and produces nascent metal contact effecting a metallurgical bond, and does so without large deformation of the material being joined. Because ultrasonic welding is accomplished at low temperatures, no melting or other significant heat effects occur, and the metallic weld zone retains its cold worked or heat treated properties and further will not deteriorate by reason of any subsequent thermal treatment.

Ultrasonic welding equipment is available or may readily be designed for splicing the ends in a single web of foil to obtain a continuous length. Since pack-rolled foil consists of top and bottom, or inner and outer, webs, the splicing of ends of both webs in pack relationship by ultrasonic welding means, to obtain two continuous co-extensive lengths without effecting a weld between the superposed webs, requires relatively complex welding arrays. That is, ultrasonic welding of both webs of pack-rolled foil, as heretofore practiced, involves employing a system of rollers for maintaining the localized lengths of the two webs in separated positions during welding, and using two welding heads and anvils, one for each web. In addition, tensioning equipment is required to handle separately the webs and broken ends and to retain both webs in substantially the same length to eliminate wrinkling of the foil.

This invention has as its object to provide a rapid and convenient method for splicing by ultrasonic welding means the free or broken ends of webs of aluminum foil in pack-relationship of two superposed webs, to obtain webs of co-extensive, continuous lengths without a weld between the superposed webs.

It is another object of the invention to provide a method of the above type devoid of the disadvantages hereinbefore described and thereby obviating the requirement for a complex welding array.

These together with other objects and advantages of the invention will best be understood by referring to the following detailed specification and preferred embodiment thereof, and to the accompanying drawings where:

FIGURE 1 diagrammatically illustrates apparatus suitable for carrying out the invention in the treatment of aluminum foil in pack-roll relationship.

FIGURES 2, 3 and 4 illustrate, in enlarged views, steps involved in the invention.

FIGURE 5 illustrates, in enlarged view, the spliced webs in pack relationship.

In accordance with the present invention, where a break in the webs of pack-rolled foil occurs, the ends of the webs may be spliced by a relatively simple method utilizing ultrasonic welding means. A coil of pack-rolled foil consisting of two superposed webs of aluminum foil is unwound, conveniently also passed between shear knives, and subsequently separated and rewound in separate coils. In splicing both webs of pack-rolled foil, the ends of the webs from the unwind coil and from the rewind coil are preferably cut straight across to be approximately square. The free ends of one web extending from the unwind coil and from the rewind coil are lapped over a supporting welding anvil. In the preferred embodiment of our invention, the anvil is a roll provided intermediate the unwind and rewind coils, although one of the coils may itself serve as an anvil. The overlapping ends of the web are held in a smooth position, and preferably taut, across the anvil, and ultrasonic welding energy is applied to at least a portion of the overlapping zone to effect a welded splice. Free ends of the second web are similarly overlapped and welded by ultrasonic welding energy. However, to prevent a weld between the two spliced webs which are not to be bonded to each other, a suitable strip-like stop-off material is interposed between the first web and at least a portion of the lapped zone of the second web. The stop-off permits the lap weld in one web to be effected thereover and over the other web without effecting a weld between the two spliced webs.

The stop-off material is preferably a relatively thin material, either flexible or stiff, and sufficiently hard as not to absorb an excessive amount of ultrasonic vibratory energy. Also, it is desirable that the stop-off material should not mar, tear or otherwise damage or disfigure the foil. Stop-off material found suitable for our invention includes metallic materials such as foil and sheet, especially of aluminum and steel, paper, particularly hard-sized paper or supercalendered paper, sulfate paper, glassine, and the like. The preferred metallic materials include those from the group consisting of aluminum foil having an anodically produced oxide coating on both surfaces thereof, aluminum sheet (whether or not oxide coated), steel foil and steel sheet. The aluminum foil found most suitable as a stop-off material is preferably not less than 0.00035 inch thick, as thinner gauge foil will not conveniently take an anodic coating of substantial thickness. Generally, it is neither necessary nor desirable to employ a stop-off exceeding approximately 0.02 inch in thickness, and preferably the thickness is less than about 0.01 inch. Where a stiff sheet material is acceptable, it is necessary that the material conform to the general contour of the surface of the lapped first web and anvil roll. It should be understood, of course, that the thickness of the stop-off employed may vary depending on the gauge metal foil to be welded, upon the contact pressure of the welding head on the anvil and upon welding power necessary to effect the weld.

Referring to the drawings, and particularly to FIGURE 1, bottom and top webs 2 and 4, respectively, of aluminum foil are shown as they would be continuously drawn, in the direction indicated by the arrow, from an unwind coil 6 of pack-rolled foil, under an idler roll 8, and around an anvil roll 10 for splicing the ends of the webs, to be discussed in greater detail below. The spliced webs of continuous lengths may be finally taken up in separate rewind coils 12 and 14, cradle rolls 16 being employed to facilitate rewinding operations.

During operation, where a break in the webs occur and it is necessary or desirable to splice each web to obtain equal continuous lengths, the free ends of each web extending from the unwind and rewind coils are cut straight across to be approximately square. Bottom web 2 may be welded first by forming a lapped joint of the ends over the anvil roll 10. The ends of the foil webs may be held in place over the anvil roll 10 for welding by any suitable means such as by providing auxiliary perforated hollow tensioning rolls (not shown) and applying a vacuum to such rolls. We prefer to retain the free ends of the webs in position for welding by applying films of volatile mineral hydrocarbon liquid to the anvil roll 10 and between the lapped ends of the foil web. The liquid employed exhibits a minimum tenacity between the foil and anvil surfaces such that the surfaces adhere or cling to each other temporarily, and yet will not contaminate the foil. Common light mineral hydrocarbons, both straight chain and branch chain, such as gasoline, mineral spirits, kerosene, benzene and naphtha are particularly useful. Lubricating oils and high molecular weight hydrocarbons are undesired as they leave carbon deposits, and water is not desired because of water staining problems that may be encountered on aluminum foil.

A convenient splicing procedure is as follows: The mineral hydrocarbon is applied by means of a stencil brush to at least a portion, such as the weld area, of the anvil roll 10. The ends of webs 2 and 4 extending from the rewind coil 12 and 14, respectively, are stretched over the anvil roll 10 and smoothed out to retain uniform adherence of the underside of web 2 to the anvil. The outer or top web 4 from the rewind coil 14 is peeled back from the anvil roll, thereby leaving the bottom web 2 temporarily adhering to the anvil. Where desired, webs 2 and 4 may be separated prior to adhering web 2 to the anvil. To facilitate separating the webs, it is preferable to extend the ends of webs 2 and 4 a few inches beyond the anvil roll such that the zone or band of web 2 adhering to the anvil extends back from the very end. Upon separation of the webs 2 and 4, a free end or tail of web 2 hangs over the anvil and this excess length may be removed by means of a tear bar (not shown). A coating of the mineral hydrocarbon is then applied to an exposed portion of the anvil roll and over that area of the web 2 adhering to the anvil. Webs 2 and 4 extending from the unwind coil 6 are stretched across the anvil so as to overlap the end of web 2 extending from rewind coil 12 and adhering to the anvil as explained above. The edges of the overlapped webs extending from opposite directions are aligned, and the webs smoothed out. The outer web 4 is peeled back from the inner web 2 thereby leaving the ends of web 2 overlapped substantially as shown in FIGURE 2, the overlapped ends being retained in position temporarily by means of the mineral hydrocarbon. To facilitate welding and to obtain a uniform weld, the webs are preferably maintained in a taut position across the anvil. The ultrasonic welding head 18 is brought into position, and ultrasonic welding energy is applied to overlapping webs to effect a weld at the lapped zone. The excess foil or tail on web 2 extending from unwind roll 6 may be removed by means of a tear bar (not shown). It will be observed that the process allows for trimming of each tail as the webs remain in the one position over the anvil thereby obviating the need for advancing the webs and subsequently removing the tails.

An appropriate stop-off material 20 is placed over the bottom web 2 which has been spliced (see FIGURE 3). The stop-off will normally bridge the completed weld zone in web 2. It is generally desirable to retain the stop-off in position as by applying a film of the mineral hydrocarbon to the web 2 or the underside of the stop-off, or to both. When the mineral hydrocarbon is employed, it is preferable to use a metallic stop-off material which is resistant to the hydrocarbon. Paper stop-off material may be retained in position by a suitable mechanical means. After the stop-off has been positioned on web 2, a film of the mineral hydrocarbon is applied to the exposed surface of the stop-off, and the end of web 4 extending from rewind roll 14 is stretched over the stop-off and smoothed out. The tail is trimmed, the solvent is again applied to the top of web 4 and an exposed portion of the stop-off, and web 4 extending from the unwind roll 6 may be stretched in a smooth condition across the anvil so that the ends of web 4 overlap (see FIGURE 4). The weld is then completed and the tail is trimmed as explained with web 2. When a stiff stop-off is employed, the tension on the spliced webs may be relaxed slightly and the stop-off removed from between the webs, or the webs may be advanced a short distance to carry the stop-off material past the anvil roll and the stop-off then removed. FIGURE 5 illustrates the spliced webs after the stop-off has been removed from between the webs. The webs 2 and 4 are then continuously wound on separate rewind rolls 12 and 14, respectively. Where a flexible stop-off is employed, it may be conveniently wound along with the foil webs until the webs are separated into separate coils at which point the stop-off will fall out between coils 12 and 14.

As specific examples, pack-rolled aluminum foil of 99.45% purity in hard temper and 0.00035 inch thick were welded in accordance with our invention employing the following stop-off materials:

Anodized aluminum foil including thicknesses in inches of 0.0035, 0.005, 0.007, 0.001 and 0.002.
Aluminum sheet 0.009 inch thick.
Stainless steel foil 0.0015 inch thick.
Steel shim stock 0.001 inch thick.
8, 12 and 18 pounds per ream tissue paper.
10 pounds per ream sulfite tissue paper.
10 pounds per ream sulfate tissue paper.

Of course, many variations may be practiced in accordance with the invention as herein claimed.

What is claimed is:

1. A method of ultrasonic weld-splicing ends of webs of aluminum foil in pack relationship consisting of first and second superposed webs, to obtain both webs in continuous and co-extensive lengths, comprising lapping two ends of the first web to be spliced, subjecting at least a portion of the resulting lapped zone to ultrasonic welding energy to effect a welded splice, placing a strip-like stop-off material over said spliced first web, lapping the ends of the second web to be spliced in such a manner as to interpose said stop-off material between said first spliced web and at least a portion of the lapped ends of said second web, and subjecting at least a portion of the resulting lapped zone of said second web over said stop-off material to ultrasonic welding energy to effect a welded splice, said stop-off material permitting welding of said second web splice without effecting a weld between the two said spliced webs.

2. The method according to claim 1 wherein the stop-off material employed is selected from the group consisting of aluminum foil having an anodically produced oxide coating on both surfaces thereof, aluminum sheet, steel foil and steel sheet.

3. The method according to claim 1 wherein the stop-off material employed is paper.

4. The method of claim 1 wherein the stop-off material employed is a flexible material permitting subsequent passage of the spliced webs in pack relationship over curved surfaces without necessitating prior removal of said stop-off material from between the webs.

5. The method of claim 1 wherein the stop-off material employed is a metal sheet adapted to be removed from between the superposed webs.

6. A method of ultrasonic weld-splicing ends of webs of aluminum foil in pack relationship consisting of first and second superposed webs, to obtain both webs in co-extensive, continuous lengths that may be subsequently separated, comprising lapping two ends of the first web to be spliced over a welding anvil roll, subjecting at least a portion of the resulting lapped zone to ultrasonic welding energy to effect a welded splice, placing a strip-like stop-off material over said spliced first web, said stop-off material conforming to the contour of the surface of the first web on said anvil roll and adapted to be removed from between the superposed webs, lapping the ends of the second web to be spliced over said stop-off material in such a manner as to interpose said stop-off material between said first spliced web and at least a portion of the lapped ends of said second web, and subjecting at least a portion of the resulting lapped zone of said second web over said stop-off material to ultrasonic welding energy to effect a welded splice, said stop-off material permitting welding of said second web splice without effecting a weld between the two said spliced webs, whereby the two spliced webs may be processed over said anvil roll in co-extensive, continuous lengths and separated when desired.

7. A method of ultrasonic weld-splicing ends of webs of aluminum foil in pack relationship consisting of first and second superposed webs to obtain both webs in co-extensive, continuous lengths that may be subsequently separated, comprising lapping two ends of said first web to be spliced over an anvil roll and temporarily retaining said lapped ends in position for welding by films of a mineral hydrocarbon liquid applied between the first end and the anvil roll and between the two lapped ends, subjecting at least a portion of the resulting lapped zone to ultrasonic welding energy to effect a welded splice, placing a metallic stop-off material over the surface of said spliced first web and temporarily retaining it in position by a film of said mineral hydrocarbon liquid applied between said first spliced web and said stop-off material, lapping the ends of the second web to be spliced in such a manner as to interpose said stop-off material between said first spliced web and at least a portion of lapped ends of said second web and temporarily retaining said lapped ends of said second web in position for welding by films of said mineral hydrocarbon liquid applied between said stop-off material and the first end of said second web and between the lapped ends of said second web, and subjecting at least a portion of said lapped zone of said second web over said stop-off material to ultrasonic welding energy to effect a welded splice, said stop-off material and said films of hydrocarbon liquid permitting welding of said web splices without effecting a weld between the two spliced webs.

References Cited in the file of this patent

UNITED STATES PATENTS

| | | |
|---|---|---|
| 2,440,664 | Irons | Apr. 27, 1948 |
| 2,946,120 | Jones et al. | July 26, 1960 |